United States Patent [19]

Donahue et al.

[11] 4,104,633
[45] Aug. 1, 1978

[54] EXTENDED TARGET-LOG CFAR PROCESSOR

[75] Inventors: Thomas H. Donahue, Glendale; John F. Chaney, West Covina, both of Calif.

[73] Assignee: International Telephone and Telegraph Corporation, New York, N.Y.

[21] Appl. No.: 788,134

[22] Filed: Apr. 18, 1977

[51] Int. Cl.² ............................................. G01S 7/02
[52] U.S. Cl. .................................................. 343/7 A
[58] Field of Search ........................................ 343/7 A

[56] References Cited

U.S. PATENT DOCUMENTS

| | | | |
|---|---|---|---|
| 3,701,149 | 10/1972 | Patton et al. | 343/7 A X |
| 3,778,822 | 12/1973 | Bauer | 343/7 A |
| 3,778,825 | 12/1973 | Ares et al. | 343/7 A |
| 3,838,422 | 9/1974 | MacArthur et al. | 343/7 A |
| 3,946,382 | 3/1976 | Kossiakoff et al. | 343/7 A X |
| 3,950,748 | 4/1976 | Busy | 343/7 A |
| 3,995,270 | 11/1976 | Perry et al. | 343/7 A |
| 4,013,998 | 3/1977 | Bucciarelli et al. | 343/7 A X |

*Primary Examiner*—T.H. Tubbesing
*Attorney, Agent, or Firm*—William T. O'Neil

[57] ABSTRACT

A constant false alarm rate video processor which uses a tapped delay line operating as a "sliding range window" to provide tap outputs corresponding to the center of the delay line and a predetermined number of discrete range cells on either side thereof. A "least of" circuit is responsive to all taps except the center tap of the delay line and the mininum signal extant on these taps is outputted and substracted (in scale factored form) from the signal of the delay line. The circuit thereby adaptively excludes target and ground clutter bias in providing the CFAR (normalized) signal output of the combination. An additional circuit arrangement is shown for digitally mapping the "least of" signal values over a predetermined threshold. The digital map output converted to analog then provides the scaled "least of" signal to be subtracted from the central range cell and for controlling the threshold of response of the mapper.

12 Claims, 7 Drawing Figures

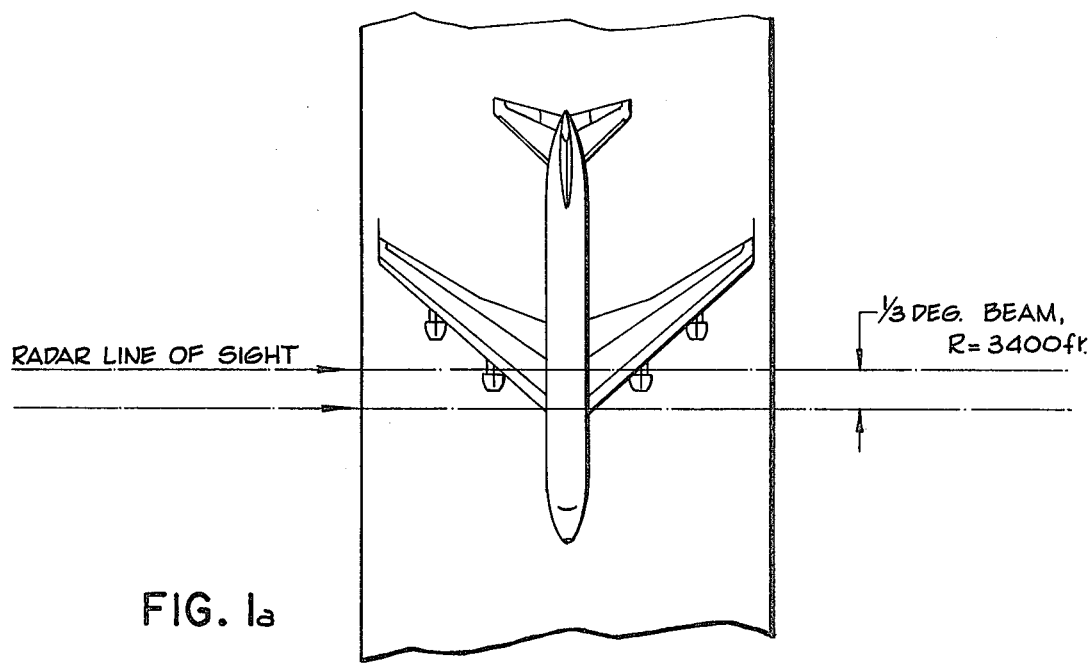
FIG. 1a
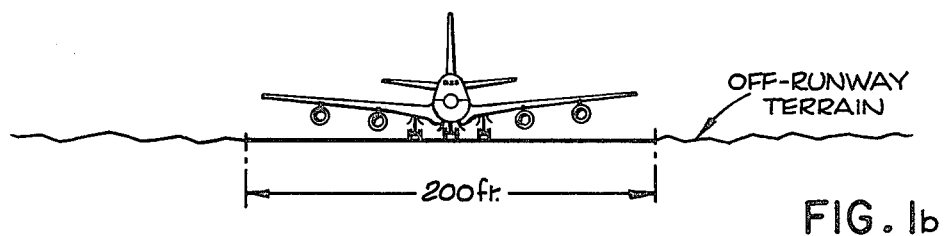
FIG. 1b
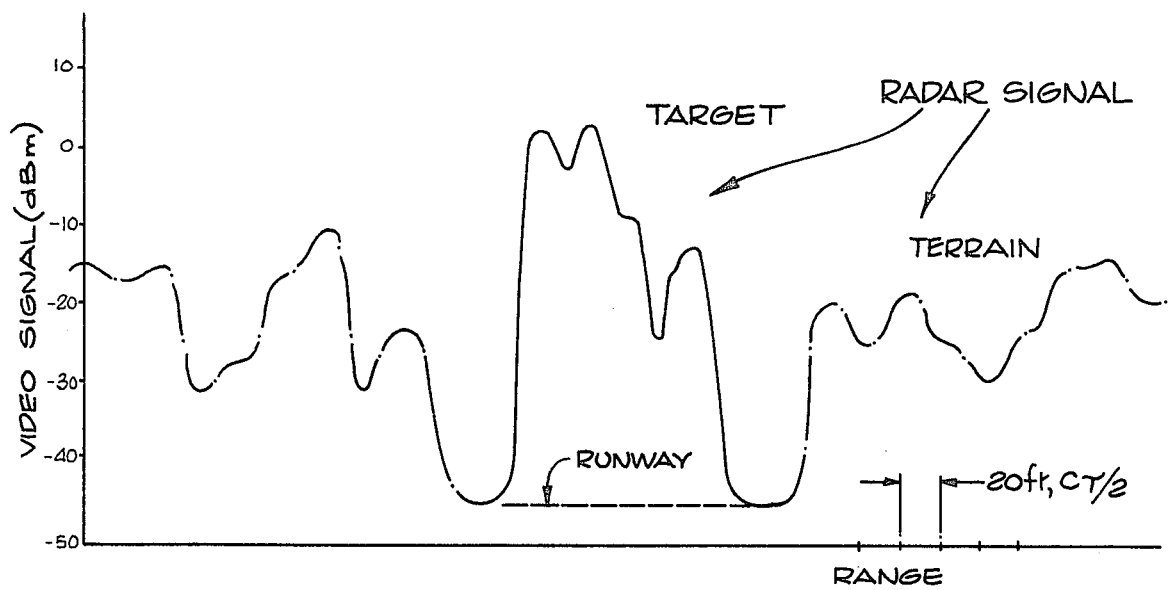
FIG. 2   TARGET AND GROUND CLUTTER SIGNALS

EXTENDED TARGET-LOG CFAR PROCESSOR

BACKGROUND OF THE INVENTION

1. Field of the Invention

The invention relates to radar systems generally and, more particularly, to CFAR video signal processing therein.

2. Description of the Prior Art

The term, CFAR (constant false alarm rate), is well understood in the radar arts.

The concept of "false alarms" relates to undesired echoes from rain and other hydrometeoric phenomena, clutter and back scatter signals from other radiating sources which, in some cases, can exceed the bona fide target signal level, at least over the short term. Often, these undesired signals exceed receiver noise level and may completely obliterate a radar display or may overload signal processing computers which make the yes-no decisions as to which signals are bona fide echoes or targets of interest.

The textbook radar handbook by Merrill I. Skolnik (McGraw-Hill, 1970) discusses CFAR considerations in Chapter 5, devoted to receivers. In particular, CFAR considerations are discussed at Section 5.8 in that chapter, and the logarithmic video detector receiver technique is discussed in Section 5.9 .

The use of a radar receiver with logarithmic detector is known to be useful in maintaining a constant false alarm rate in the presence of variable intensities of noise, rain clutter, sea return, etc.

The patent literature and other technical publications contain many examples of video signal processing in order to enhance signal-to-noise ratio in difficult environments.

In the special case of surface surveillance by radar, such as in airport surface detection and tracking of aircraft or other vehicles, a special set of problems arise. Among these are the large extent of the target return signal compared to the size of the radar range resolution cell, there being a 5-1 ratio in a typical situation involving a large modern airliner on a runway. In addition, the range intervals adjacent to the runway are likely to contain large amplitude ground clutter, due to off-runway terrain. Still further, a region of relatively low amplitude ground clutter generally exists in small range regions immediately adjacent to the target return signal. This is the region of runway back scatter.

The above recited special conditions rule out conventional types of prior art CFAR processing. Log-FTC is inapplicable, due to the waveform differentiation process used, only the leading edge of the target return waveform being retained in the processor output. Preservation of target return shape on an operational display for a successful airport ground surveillance radar system is a necessity.

The so-called delay line differentiator (DLD), pulse-length discriminators (PLD), and high pass side lobe reduction filter circuits (SRF) also differentiate the target return waveform and therefore are not suitable for this application. A paper by R. J. Evans and E. F. Thomas, entitled, *Optimal Resolution of Rectangular Pulses and Noise*, IEEE Transactions, AES-11, No. 3, May, 1975, pages 372–379, describe the prior art SRF technique.

The technique of cell averaging (or mean level detection) is a form of CFAR processing described by V. G. Hansen and H. R. Ward, in their paper, *Detection Performance of the Cell Averaging LOG/CFAR Receiver*, IEEE Transactions, AES-8, No. 5, September, 1972, pages 648–652. Such a technique is also inapplicable for the particular requirement aforementioned, since a set of reference radar resolution cells which are free from ground clutter cannot be guaranteed in the ground surveillance environment. Off-runway ground clutter would tend to capture this form of CFAR and thereby severely degrade target detectability.

The manner in which the present invention deals with the disadvantages of the prior art to provide a novel form of CFAR, particularly adaptable to the surface surveillance problem, will be evident as this description proceeds.

SUMMARY

The arrangement or system in accordance with the present invention starts with the video output of a logarithmic detector. That is, logarithmic detection is highly advantageous for the operation of the device of the invention.

A tapped delay line or its equivalent is used to obtain contemporaneous samples of the video contained in a set of radar resolution cells, either side of a central cell. A "least of" circuit is used to select the cell containing video of smallest amplitude among those on either side of the said central cell. The selected minimum signal is subtracted from the signal contained in the central cell to produce the CFAR video output. This delay line circuit constitutes a "sliding range window" process in which the video signal in a central resolution cell is constantly compared against a reference signal which is the aforementioned smallest amplitude video contained in the set of cells defined by the sliding window (not including the central cell itself). A performance analysis follows hereinafter, showing that a processor of the form according to the invention provides a CFAR regulation when the prediction noise is modeled as a stationary Gaussian process (Rayleigh envelope statistics). Thermal noise and uniform rain clutter conform to this model.

The so-called "least of" test of samples is based on the signal which is the maximum one of two adjacent cells. A circuit for performing this maximum selection function precedes the "least of" circuit. By taking the maximum of two adjacent cells, the noise estimate is improved, the process having a property similar to averaging two samples. Such a process is, of course, not limited to two cells, and an even better estimate being provided by three or four adjacent cells similarly processed before the "least of" circuit during any one PRT (a PRT being a pulse repetition time), if one could be assured that three or four adjacent clutter cells per runway would usually be extant.

It is assumed, however, that only two such adjacent clutter cells are available between ground and extended aircraft.

A CFAR map, which is preferably digital in nature, providing a range and azimuth map of the surface of concern by range-azimuth cells, is employed as an additional measure when the basic radar is not frequency diversified. The clutter signals present in each cell are stored in a digital number discretely for each such cell. Entry into the CFAR map is through a binary threshold circuit, that is, one which may produce a one or first condition in response to a signal corresponding to a given cell above a predetermined threshold and a zero or second condition output otherwise. This binary threshold circuit is responsive to the output of the "least of" circuit for a map write-in, readout of the map being accomplished synchronously to a digital-to-analog converter. The resulting analog signal is then used as an adaptive feed-back to modify the threshold of the binary threshold circuit, the same signal being also applied to a scale factor circuit, adjusted to provide a predetermined desired false alarm rate. This scaled up clutter-representing signal is then subtracted from the central (timewise) cell of the aforementioned sliding window plurality of adjacent cells, to provide the desired CFAR processed video output.

If clutter from hydrometeoric phenomena (rain, etc.) were decorrelated from pulse-to-pulse, then the ET LOG-CFAR system of the present invention can provide low processing loss (typically less than 3 decibels) equivalent to pulse-to-pulse noncoherent integration. Thus, if there is such decorrelation as provided by frequency agile (frequency) radar systems, then the CFAR mapping function is not necessary for the provision of a highly useful CFAR capability. The details of the structure and functions thereof for accomplishing the ET (extended target) LOG-CFAR according to the present invention will be described in more detail hereinafter.

BRIEF DESCRIPTION OF THE DRAWINGS

FIGS. 1A and 1B are plan and head-on horizontal views, respectively, of a large modern commercial jet aircraft on a runway to illustrate the problem and solution.

FIG. 2 is a typical plot of target and ground clutter signal amplitudes as seen by a radar looking across the runway as shown in FIG. 1A.

DESCRIPTION OF THE PREFERRED EMBODIMENTS

FIGS. 1A and 1B assume that a radar of the type utilizing the present invention is located to the left and has an instantaneous pointing angle along the identified radar line-of-sight. From these figures, it is evident that signal return will be produced by the large aircraft on the runway, and that, in addition, there will be back scatter from the off-runway terrain and from the relatively smoother runway surface itself.

FIG. 2 is a video signal return envelope as seen by the radar contemplated in FIGS. 1A and 1B as a function of range. There is intended to be visual alignment among FIGS. 1A and 1B and 2 so that the relative back scatter from off-runway terrain, the aircraft itself, and the smooth runway surface immediately preceding and immediately following the bulk of the aircraft return relate along the time/range axis. The typical runway width of 200 feet is illustrated and, in accordance with the parameters required of a surface surveillance radar system, a range cell C $\tau/2$ of 20 feet is contemplated. A radar system operating wavelength around 1.9 cm would be appropriate.

The video envelope illustrated in FIG. 2 is that which would be obtained as a return echo signal train by a radar system looking along the "radar line of sight" as illustrated in FIG. 1 (a). Typically, a $\frac{1}{3}°$ beam at a range of 3400 feet could be considered typical for a system of the type contemplated.

Figure 3:
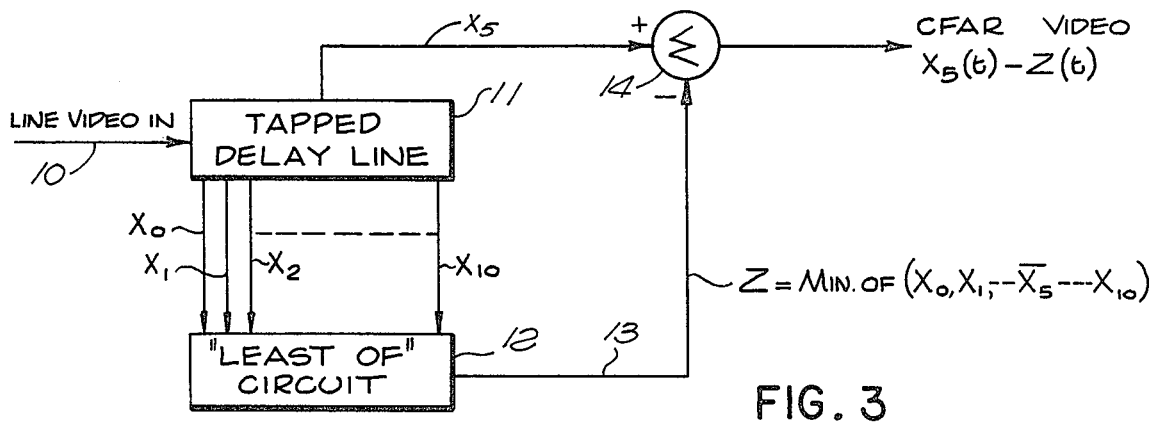
FIG. 3 is a basic circuit of the present invention in simple form.

Basically, the invention may involve three cooperating subassemblies, the first of these being the circuits illustrated in basic form in FIG. 3 for obtaining a "least of" clutter reference representative of the back scatter return in the troughs preceding and immediately following the main target return, as seen on FIG. 2. This level of return corresponds to that obtained from the relatively smooth runway surface.

The second aspect of the system of the present invention involves selection of the maximum of two range cells from the LOG video immediately preceding the circuitry represented in FIG. 3. Finally, components and functions represented in FIG. 6 added to the aforementioned structure provides for the CFAR map which is essentially a two-dimensional memory by range-azimuth clutter cells where hydrometeoric back-scatter signals (rain, sleet, etc.) are present within the volumetric coverage of the radar system. More samples than the one pulse detection otherwise afforded (ten, for example) provide for clutter integration through the mapping process, resulting in lower processing loss overall. The mapping function essentially "remembers" and integrates a total clutter picture over a plurality of antenna rotations.

Considering now the nature of the basic circuit of FIG. 3, assume a LOG video input at 10. The tapped delay line 11 provides 11 outputs $X_0$ through $X_{10}$. A centrally located tap $X_5$ is outputted separately, but all other outputs are fed to the "least of" circuit 12 which outputs the smallest signal extant within the delay line outputs (except for $X_5$) for any one pulse repetition interval of the radar system. That "least of" signal is available on 13 and is subtracted from the signal on $X_5$ in a differencing circuit (algebraic adder) 14. Accordingly, the output 15 is CFAR video represented by $X_5(t) - Z(t)$, where Z is the minimum of those signals entering the "least of" circuit 12 as aforementioned, i.e., the signal on 13. There are a number of logic circuit approaches known to those of skill in this art for developing an output equal to the least of a plurality of inputs.

Figure 4:
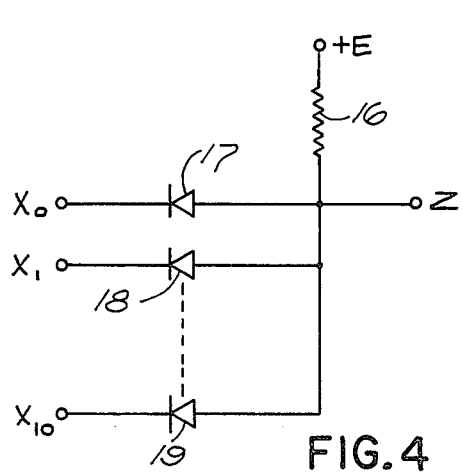
FIG. 4 is a basic diagram of a "least of" circuit for the arrangement of FIG. 3.

FIG. 4 is a simple, basic circuit for accomplishing that objective. A plurality of diodes are used, one for each of the inputs $X_0$ through $X_{10}$ (except $X_5$), corresponding to diodes 17, 18 and 19, respectively. A source (+E) forward biases all of these diodes in parallel through limiter resistor 16. If the forward bias is effectively equal to the expected minimum or "least" signal amplitude, the diode path corresponding to the "least of" input signals is passed to the Z terminal, while the larger signals drive their respective diodes farther into the back biased condition.

Figure 5:
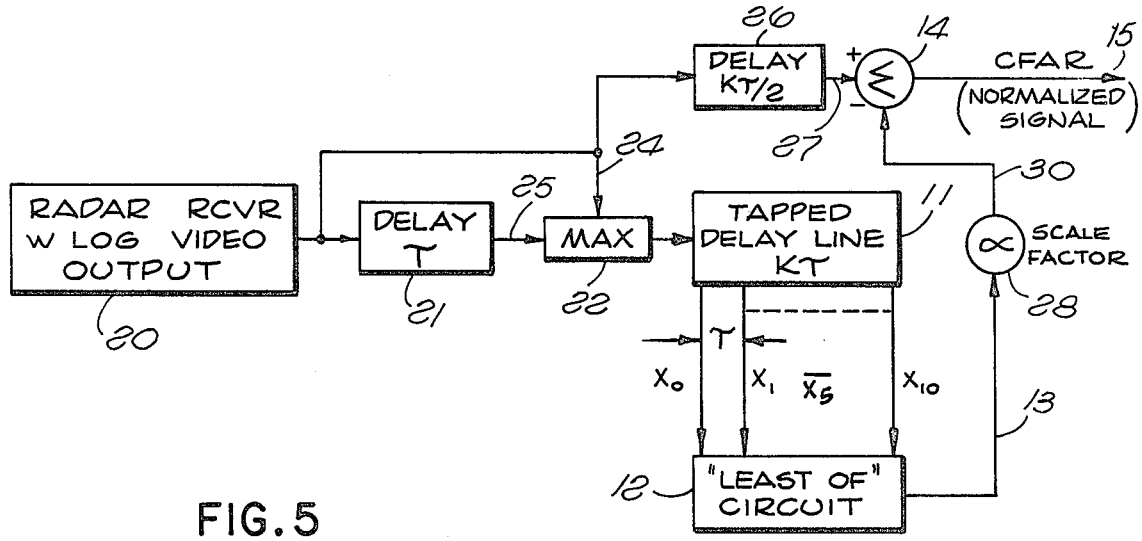
FIG. 5 is a more detailed schematic block diagram of a CFAR arrangement in accordance with the present invention without the digital CFAR mapping function.

In FIG. 5, block 20 represents the radar receiver with LOG video output, this being a known arrangement in the prior art.

The combination of delay 21 and "MAX" block 22 provides for the outputting of a signal on 23 which is the larger of the signals in two adjacent range cells. The delay 21 provides a one range cell (one transmitted pulse width) delay into 22, such that the two inputs 24 and 25 to the maximizing circuit 22 are essentially time coincident or, stated otherwise, a given range cell on lead 24 is coincident with the previous range cell delayed one $\tau$ on 25. It can be shown that this pair-wise maximization reduces the variability of the CFAR reference signal and minimizes loss of detectability of the input signals.

The tapped delay line 11, as illustrated in FIG. 5, has a total delay of K$\tau$, where K is, in this case, assumed to be 10. The taps are spaced by the factor $\tau$, but the center one, corresponding X$_5$, is omitted. That centrally located tap, if present, would provide the same net delay as provided by separate delay 26. Accordingly, on lead 27, the centrally located range cell is represented essentially in the center of the distributed delays from 11.

The "least of" circuit 12 is the same as that illustrated and described in connection with FIG. 3, and its output 13 is fed to the differencing circuit 14 through a scale factor circuit 28 in which an up-scaling factor $\alpha$ is applied. Accordingly, the CFAR processed (normalized video signal) is outputted at 15 as the difference between the signals on 27 and 30, respectively. Concerning the up-scale factor $\alpha$, it is to be noted that this may be predetermined or selected to adjust to a desired false alarm rate.

It can be shown analytically that a CFAR processor, in accordance with FIG. 5, can be used to achieve efficient detection while preserving the desired performance characteristics with respect to CFAR. It can also be shown that the detection efficiency of the apparatus of FIG. 5 is essentially the same as provided by a conventional LOG-FTC processor. Such a conventional LOG-FTC processor might be that described by V. G. Hansen in a paper, entitled, *Studies of Logarithmic Radar Receiver Using Pulse-Length Discrimination* (published in the IEEE Transactions, AES-1, No. 3, December 1965, pages 246–253).

Figure 6:
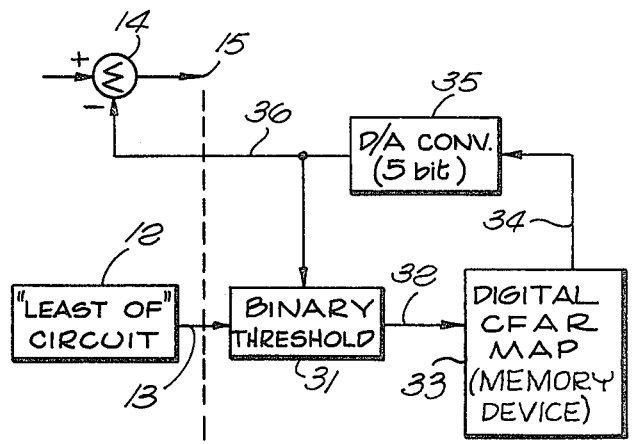
FIG. 6 is a modification of the circuit in FIG. 5 showing the inclusion of a digital CFAR mapping attachment.

The radar transmitter associated with the receiver 20 of FIG. 5 may advantageously be of the frequency agile type providing a program of frequency diversity. Such frequency diversity is a very desirable feature of a radar system including the apparatus according to the invention. Frequency diversity and its advantageous decorrelation of back scatter from hydrometeoric phenomena is known to those skilled in this art.

Where frequency diversity is not employed, the additional combination depicted in FIG. 6 may be used to enhance the post-detection integration of useful signals vs. clutter and other undesired back scatter.

The apparatus involved in the variation of FIG. 6 is essentially the same as that of FIG. 5, except that, in lieu of the scale factor circuit 28 of FIG. 5, a digital CFAR (clutter reference) map subcombination is included. In FIG. 6, the output signal 13 from the "least of" circuit 12 is passed through a binary threshold circuit 31. This circuit merely provides a first condition (a logical 1, for example) for any signal on 13 in excess of a predetermined threshold, and a second condition (a logical 0, for example) otherwise. A digital CFAR map 33 is essentially a digital memory in two-dimensions comprising range-azimuth coverage by range-azimuth (clutter) cells. A third dimension involves a digital word description of the amplitude in each such cell.

In FIG. 6, it is assumed that a 5-bit word is employed, providing 31 shades of amplitude within each of those map cells. These output (1 or 0, for example) signals of 31 are applied to the mapper 33 on lead 32; however, as in other digital instrumentation, it will be understood that clock control synchronizing circuits are provided in the well understood manner. Digital clutter mapping, per se, independent of the present novel combination, must be said to be known in this art.

Synchronous reading of the CFAR map 33 provides an output 34, which is converted to analog by D/A converter 35, and is applied as a feedback to the threshold circuit 31 so that it is adaptive in varying clutter situations. The signals on this feedback and output connection 36 are also applied to the differencing circuit 14 to generate the CFAR signal equivalent to that at 15 in FIG. 5, except for the addition of the described clutter mapping structure and function.

It can be shown analytically that a processor of the form illustrated and described in connection with the present invention provides CFAR regulation when the predetection noise is modelled as a stationary Gaussian process (Rayleigh envelop statistics). Thermal noise and uniform rain clutter conform to this model.

It can also be shown that the storage of signals on lead 32 in the CFAR map memory 33 amounts to the collection and storage of uncorrelated samples throughout the volume of scan by range-azimuth cells and then averaging these over a plurality of antenna rotations. The map is obviously polar in nature, and the typical range-azimuth cell might be one-half nautical mile by ten degrees.

The actual mechanism for storing the 5-bit digit representative of clutter amplitude in each of the aforementioned cells may involve a sequential observer counter (up-down counter) to respond to output signals on 32, representative of threshold crossings within 31 and provide a weighted sum in relation to these clutter crossings vs. misses. It can be shown that, to maintain CFAR with this process, an up-count of +4 on a hit or a down-count of −1 is optimum for Rayleigh distributed noise. On each scan cycle, the threshold of 31 is updated in accordance with values on lead 36.

Variations and modifications of the apparatus illustrated and described are obviously possible within the purview of the invention and, accordingly, it is not intended that the drawings of this description should be considered as limiting but rather only typical and illustrative.

We claim:

1. A CFAR radar video signal processor comprising:
   first means including at least one delay line responsive to said radar video signal and having a predetermined plurality of outputs spaced in time by one range cell of the radar system in which said CFAR processor is being used;
   second means including a least of circuit connected to provide an output corresponding to the least of the signals extant on any of said first means outputs except a predetermined centrally located output, in time;
   and a differencing circuit responsive to said least of circuit output and to the signal provided by said first means corresponding to a centrally located signal to subtract said least of circuit output from said signal on said centrally located tap to produce a CFAR video output signal.

2. Apparatus according to claim 1 in which said centrally located first means output is defined as being that at which the effective delay is K$\tau$ and in which the overall delay from input to the most delayed output of said first means is 2K$\tau$, and $\tau$ is the duration of a range resolution cell of said radar system.

3. Apparatus according to claim 2 in which the receiver generating said radar video signal contains log video detection means, said video signal thereby being generated as a log video signal.

4. Apparatus according to claim 3 further including a scale factor device in the signal path between the output of said second means and said differencing circuit, the scale factor of said device being selected to provide a predetermined false alarm rate.

5. Apparatus according to claim 3 including selection means responsive to said log video signal for continuously selected as an output the greatest of the signals in two adjacent range cells and for providing said output as the input to said first means.

6. Apparatus according to claim 5 in which said first mean comprises a delay line having a delay of $K\tau$ connected to said log video ahead of said selection means for providing said centrally located first means output, and in which said first means also includes a tapped delay line of total length $2K\tau$, said taps being spaced by a time $\tau$.

7. Apparatus according to claim 2 in which said first means comprises a tapped delay line having taps providing inputs to said second means and said differencing circuit.

8. Apparatus according to claim 1 in which the receiver generating said radar video signal contains log video detection means, said video signal thereby being generated as a log video signal.

9. Apparatus according to claim 8 in which a clutter mapping device is inserted in the signal path between said second means and said differencing circuit, said mapping device comprising a memory device and an input threshold circuit therefor to store the outputs of said second means on a two-coordinate basis and by range-azimuth cells, said memory device also synchronously providing integrated clutter signals originating from the output signals of said least of circuit, to said differencing circuit.

10. Apparatus according to claim 9 in which said input threshold device is a digital device providing a binary signal in a first condition corresponding to each signal from said second means in excess of a predetermined amplitude, and providing said binary signal in a second condition at all other times, and in which said memory device comprises means responsive to said threshold device for increasing the stored digital value in said memory in each of said range-azimuth cells by a first predetermined amount in response to each corresponding first condition output from said threshold device, and for decreasing said stored digital value in said memory in each of said range-azimuth cells by a second predetermined amount less than said first predetermined amount in response to each corresponding second condition output from said threshold device, said apparatus further including a digital-to-analog conversion unit synchronously reading said stored digital values and converting them to analog signals for application to said differencing circuit.

11. Apparatus according to claim 1 including selection means responsive to said log video signal for continuously selected as an output the greatest of the signals in two adjacent range cells and for providing said output as the input to said first means.

12. Apparatus according to claim 1 in which a clutter mapping device is inserted in the signal path between said second means and said differencing circuit, said mapping device comprising a memory device and an input threshold circuit therefor to store the outputs of said second means on a two-coordinate basis and by range-azimuth cells, said memory device also synchronously providing integrated clutter signals originating from the output signals of said least of circuit, to said differencing circuit.

* * * * *